(12) United States Patent
Beadle et al.

(10) Patent No.: US 8,829,111 B2
(45) Date of Patent: Sep. 9, 2014

(54) POLYMER MATERIAL

(75) Inventors: Brian Alan Beadle, Ottringham Hull (GB); Graham Samuel Garrett, County Down (GB); Alan Hugh Clarke, County Armagh (GB)

(73) Assignee: The Queen's University of Belfast, Belfast (GB)

( * ) Notice: Subject to any disclaimer, the term of this patent is extended or adjusted under 35 U.S.C. 154(b) by 778 days.

(21) Appl. No.: 11/664,322

(22) PCT Filed: Sep. 30, 2005

(86) PCT No.: PCT/GB2005/003753
§ 371 (c)(1),
(2), (4) Date: Mar. 25, 2008

(87) PCT Pub. No.: WO2006/035236
PCT Pub. Date: Apr. 6, 2006

(65) Prior Publication Data
US 2009/0069494 A1    Mar. 12, 2009

(30) Foreign Application Priority Data

Sep. 30, 2004  (GB) .................................. 0421706.3

(51) Int. Cl.
  *C08L 33/04*   (2006.01)
  *C08L 29/04*   (2006.01)
  *B29C 45/00*   (2006.01)
  *C08L 77/00*   (2006.01)

(52) U.S. Cl.
  USPC .......................... 525/56; 524/557; 264/331.18

(58) Field of Classification Search
  USPC ................. 524/186, 557; 525/56; 264/331.18
  See application file for complete search history.

(56) References Cited

U.S. PATENT DOCUMENTS

| | | | | |
|---|---|---|---|---|
| 4,941,991 A | * | 7/1990 | Rajamannan | 252/189 |
| 6,495,612 B1 | * | 12/2002 | Corzani et al. | 523/105 |
| 6,673,874 B1 | * | 1/2004 | Choudhery | 525/425 |
| 2004/0048006 A1 | * | 3/2004 | Venkatasanthanam et al. | 428/32.1 |
| 2004/0166350 A1 | * | 8/2004 | Brewer et al. | 428/515 |

FOREIGN PATENT DOCUMENTS

| | | | |
|---|---|---|---|
| JP | 56151780 A | 11/1981 | |
| JP | 62184113 A | 8/1987 | |
| JP | 06172568 A | 6/1994 | |
| WO | WO 98/34982 | * 8/1998 | C08K 5/04 |

OTHER PUBLICATIONS

Lupasol WF data sheet. 2004.*
Polyvinyl alcohol data sheet. 2004.*

* cited by examiner

*Primary Examiner* — John Uselding
(74) *Attorney, Agent, or Firm* — Drinker Biddle & Reath LLP

(57) ABSTRACT

A process is described for providing a polymer material by blending as a first component one or more hydrophilic polymers, and as a second component one or more neutralising chemicals, in the complete or substantial absence of water. In the absence of water, the components will not be aqueous solutions. Thus the components can be used in blending processes, and the present invention is able to form many other shapes and forms of material other than laminates on substrates.

23 Claims, No Drawings

POLYMER MATERIAL

The present invention relates to a novel material. More specifically the invention relates to a breathable chemically resistant polymer material and a method for its manufacture.

One of the main aims of all garment manufacturers is to make their products as comfortable as possible for the end user; this is especially true for producers of protective workwear. The main area where comfort can be improved is the control of moisture and heat build up. Many manufacturers have attempted to build some form of heat and moisture management systems into their garments. This works reasonably well with waterproof clothing etc. where built-in vents to atmosphere can be used.

Where the garment is a chemical or biological hazard protection suit then the issue of moisture management becomes more complicated. The garment needs to form an integral barrier against the chemical or biological hazard, whilst at the same time allow moisture to pass through it into the atmosphere away from the wearer's skin. A seemingly impossible combination of both water permeability and the chemical barrier properties is required from one material.

One aim of the present invention is to provide a commercially viable breathable film with high chemical/biological resistance.

The present invention involves combining hydrophilic materials with neutralising chemicals to form one material, and producing films etc. which will exhibit properties such as are required for a protective garment.

"Pepgel" is a known product which exhibits suitable properties for use in the manufacture of protective garments. Difficulties with pepgel lie in the production method employed in its manufacture, described in WO 03/062321. Pepgel is made using an aqueous casting process, which is expensive and not well suited to the high production levels required with breathable films. The material of the present invention has equally good chemical and biological properties as pepgel, but much easier production.

According to one aspect of the present invention, there is provided a polymer material formed by the blending of as a first component one or more hydrophilic polymers, and as a second component one or more neutralising chemicals, in the substantial or complete absence of water.

In the absence of water, the components will not be aqueous solutions such as those in WO 03/062321. Thus the components can be used in blending processes, and the present invention is able to form many other forms or shapes of material other than laminates on substrates.

The polymer material formed by blending is preferably useable either directly or indirectly in a subsequent shape-forming process such as a moulding process, for example injection moulding. Preferably, the polymer material is therefore meltable (or re-meltable if it is in a melted form during its preparation) without degradation. This is not possible with other types of polymer products intended to be used as chemical-resistant materials, such as Pepgel.

The ability of the present invention to provide a polymer material which is subsequently useable in shape-forming processes allows the present invention to provide a chemically/biologically resistant polymer material which can be formed into any shape, design, thickness, etc which is suitable for its intended use. For example, thin chemically-resistant items such as gloves, e.g. surgical gloves, could be directly formed. Thicker layers could be formed of flexible material which could be used directly as a coat or coating or outer clothing, or be introduced as a layer into other items such as clothing.

The material may be blended using any known technique or process. One technique is melt blending, wherein the temperature of the components is raised, generally in order to lower their viscosity. Such blending can be achieved by extrusion, especially compounding.

The blending of the components is preferable carried out at a raised temperature, such as approaching 100° C. or above, preferably 150° C. minimum, and often 170° C. or 180° C. minimum. Raising the temperature also helps assist in ensuring that the blending is carried out in the absence of water.

In one embodiment of the present invention, the components are dried prior to blending, so as to reduce the presence of water.

The blending may lead to direct provision of the polymer material in the desired shape or form for use or subsequent processing, or one or more further forming processes may be necessary or desired, such as granulation or other particle or piece forming. Blending by extrusion can form an extrudate which is easily granulatable as is known in the art.

Thus, according to one embodiment of the present invention, the blended polymer material is granulated so that the final polymer material is provided in the form of granules, or is defined as a granular material. Such granular material is therefore easily and readily re-useable in a shape-forming process such as injection moulding.

Where the polymer material formed by the present invention is hydrophilic or hydroscopic, it is preferable to either maintain the material in a non-water environment or atmosphere, or dry the material prior to shape-forming.

The first and second components of the process of the present invention may be admixed prior to blending, or may be admixed during the blending process. Similarly with any further components to be added. In one arrangement, at least the first and second components are admixed prior to blending for example through an extruder. In another arrangement, at least one component, for example the first component, is provided to a blending apparatus such as an extruder, followed by addition of for example the second component thereafter, for example at any injection stage or point such as by use of a post-extruder static mixer as is known in the art.

The neutralising chemical(s) may be any chemical or admixture of chemicals known for neutralising harmful and/or noxious agents such as mustard gas and the like. Many such agents are known in the art, for example, polyethyleneimine ("PEI"). Many grades of PEI are available from BASF, such as those under the brand "Lupasol". Lupasol is available in a number of grades with different viscosities.

| | |
|---|---|
| Lupasol WF - 200000 mPa · s | Lupasol FG - 3000 mPa · s |
| Lupasol G20an - 5000 mPa · s | Lupasol PR8515 - 12000 mPa · s |

In the present invention, it is preferable to use those grades of PEI having reduced water content, more preferably being 'water free', such as the PEI sold under the trade name "Lupasol WF".

Trials were conducted using 10%, 25%, 30% and 50% Lupasol WF.

The hydrophilic polymer(s) may have any degree of hydrophilicity, ranging from those polymers which could also be termed hydroscopic, to very hydrophilic polymers. Such polymers include (Polymer or poly) Vinyl Alcohols (PVOH), such as Gohsenol,
Ethylene Vinyl Alcohols (EVOH), such as Soarnol,
Poly Hydroxyethyl Methacrylates,
Poly Ethylene Oxides,
Poly Ether block Amides, such as Pebax, Breathable Thermoplastic Elastomers, such as Pebatex, Walotex, Duneflex and Arnitel, and Polyurethanes.

Hydrophilic polymers particularly suitable for the preparation of polymer materials of the present invention include: melt processable modified PVOH including the following grades:

PVAXX, available from the British company PVAXX.
ECOMATY, available from the Japanese company Nippon Gohsei.
ENPOL, available from the English company Polyval.

These materials can be compounded at 180° C., 190° C., 195° C., 200° C., 205° C.

Also useable are less melt processable unmodified PVOH grades that provide for higher loadings of PEI.

GOHSENOL, available from the Japanese company Nippon Gohsei.
POVAL/MOWIOL, available from the Japanese company Kuraray.
CELVOL, available from the American company Celanese.

These materials can be compounded at 180° C., 190° C., 200° C., 205° C., 210° C.

There is also EVOH which forms a stiffer sheet than PVOH.

SOARNOL, available from the Japanese company Nippon Gohsei.
EVAL, available from the Japanese company Kuraray.

These materials can be compounded at 180° C., 190° C., 200° C., 205° C., 205° C.

There is also PEBAX, a polyether block amide. Arkema in France produce a number of hydrophilic grades of PEBAX. These materials can be compounded at 180° C., 190° C., 200° C., 205° C., 210° C.

There are also a number of hydrophilic polyurethane grades, such as ESTANE produced by Noveon. These materials can be compounded at 170° C., 180° C., 190° C., 195° C., 200° C.

Preferably, the polymer material of the present invention comprises at least 50% by weight of hydrophilic polymer(s), and between 5 and 50% by weight of neutralising chemical(s).

The polymer material may also include other components such as colouring agents, fragrance enhancers, processing aids, flame retardants, heat stabilisers, insecticides, smell-adsorbants such as carbon, antimicrobial agents such as silver ions, etc.

According to another aspect of the present invention, there is provided a process for providing a polymer material comprising the step of:

blending as a first component one or more hydrophilic polymers and as a second component one or more neutralising chemicals, in the complete or substantial absence of water.

Preferably, the process is carried out at a raised temperature, more preferably at least above 80° C., and more preferably above 100° C.

Preferably, the process is carried out by melt blending the components.

Preferably, the blending on the components is carried out by extrusion. The extrusion provides extrusion compounding, which could use a single or twin screw extruder. One or more of the components could be pumped or similarly added onto the extruder.

Preferably, the process is carried out above the melting temperatures of the components.

Preferably, at least part of the blending of the components is shear mixing, preferably under pressure not exceeding 10,000 psi.

According to a third aspect of the present invention, there is provided a polymer material whenever prepared by a process as herein described.

Compared with the manufacturing techniques described in WO03/062321 to manufacture pepgel, the present invention provides a simple blending process which can be carried out by conventional equipment without alteration or adaptation. In particular, the present invention provides a simple extrusion blending process, which inherently provides raised temperatures needed to reduce the viscosity of, preferably to melt, the components, so as to allow their easy blending and mixing in the extrusion process, and the immediate provision of a prepared material.

The present invention provides a material which combines the neutralising aspects required for a chemically resistant material such as for use in a chemical or biological hazard protection suit, while still having the breathable qualities provided by the hydrophilic polymer.

The present invention provides a material with the ability of being produced using conventional polymer processing techniques. Thus standard processing machines can be used, such that the present invention can also provide the material in the form of extruded sheets, films and tubes, as well as injection moulding and thermoforming.

The market and uses for the material include military personnel protection suits, industrial personnel protection workwear, emergency personnel workwear, food packaging, leisure wear, and industrial seals and gaskets.

EXPERIMENTAL

Compound extruding mixing may be characterized by two main factors:

The degree of mixing, describing the degree of distribution, dispersion, and molecular inter-diffusion.

The uniformity of mixing, describing the uniformity in the degree of mixing throughout the compound.

The degree of mixing in a particular portion of a compound depends upon the level and amount of shearing that the portion received through the extruder. The level of shearing depends upon the stress level applied on the portion. The amount of shearing depends upon the residence time of the portion through the extruder. Different portions in a compound mix and can attain different degrees of mixing because they receive different levels and amounts of shearing through the extruder.

The final extrudate profile dimensions and its consistency and accuracy, depend on: (a) overall material properties, (b) extruder and die mechanical design, and (c) overall process control, including mechanical (kinematics and dynamics), material flow pressure and temperature, and environmental conditions. In polymer processing, the critical viscoelastic properties are also highly non-linear and dependent on previous stress-strain history and temperature, which are dependent on overall velocity and temperature profiles which in turn are dependent on extruder and die dimensions, and process parameters and control. Those skilled in the art know how to achieve the right process conditions for different components.

Polymer materials of the present invention can be compounded and processed on either a single or twin screw extruder which are both vented and non-vented designs, preferably followed by granulation of the extrudate.

The extrusion temperature settings will depend on the type and design of the extruder but will vary incrementally from 70 to 200° C. at the feed section up to 150 to 350° C. at the die.

Base polymers used in examples include PVOH polyvinyl alcohol, EVOH, ethylene vinyl alcohol, aliphatic polyurethane and aromatic polyurethane.

Further base polymers that are useable include polyvinyl chloride, ionomer such as surlyn, modified polyethylene and modified polypropylene, and polyethylene terephthalate (PET).

In the examples, the neutralising chemical was Lupasol WF.

Additives used in examples included glycerol, silver ions (antimicrobial agent. Further additives include Activated carbon, hydrophilic additives such as Ciba's Irgasufe, polyvel VW250 or similar, fragrance additives.

Water content depended on the additives and base polymers used. There may be minimum of 0.01% by weight up to a maximum of 1% if processed with non-vented extrusion equipment. Maximum water content can increase to 5% if processed on vented extrusion equipment.

The following table shows the permeability of an approximate 200 μm sheet extrusion from a 70% wt PVAXX and 30% wt Lupasol WF blend. This blend was extrusion compounded (with a temperature gradient of about 180-205° C.), granulated, and then sheet-extruded (at a slightly higher temperature gradient of about 180-220° C.). The permeability of the sheet material was tested following its exposure over time to sulphur mustard (HD), commonly also called 'mustard gas', soman (GD) and thicken mustard (THD).

| | | Cumulative Agent Vapour Penetration (μg/cell) | | | | | |
|---|---|---|---|---|---|---|---|
| Tst | Agent | 2 hr | 4 hr | 6 hr | 8 hr | 23 hr | 24 hr |
| 1 | HD 1 × 5 μL | 0.015 | 0.031 | 0.075 | 0.12 | 0.16 | 0.16 |
| 2 | HD 1 × 5 μL | 0.045 | 0.076 | 0.13 | 0.18 | 0.26 | 0.26 |
| 3 | HD 1 × 5 μL | 0.17 | 0.23 | 0.34 | 0.47 | 0.59 | 0.59 |
| 4 | GD 1 × 5 μL | 0.48 | 0.57 | 0.69 | 0.78 | 1.16 | 1.18 |
| 5 | GD 1 × 5 μL | 0.15 | 0.24 | 0.33 | 0.38 | 0.79 | 0.82 |
| 6 | GD 1 × 5 μL | 0.89 | 0.97 | 1.11 | 1.20 | 1.37 | 1.39 |
| 7 | THD 1 × 30 mg | 0.013 | 0.053 | 0.16 | 0.28 | 0.90 | 0.90 |
| 8 | THD 1 × 30 mg | 0.12 | 0.18 | 0.36 | 0.48 | 0.95 | 0.95 |
| 9 | THD 1 × 30 mg | 0.17 | 0.28 | 0.52 | 0.80 | 1.76 | 1.77 |

The invention claimed is:

1. A process for providing a polymer material, said process comprising melt blending, in the complete or substantial absence of water, a mixture consisting essentially of at least 50 to 95 weight % of a first component, the remainder being a second component said first component being at least one hydrophilic polymer selected from the group consisting of Poly Vinyl Alcohols, Ethylene Vinyl Alcohols, Poly Hydroxyethyl Methacrylates, Poly Ethylene Oxides, Poly Ether block Amides, Breathable Thermoplastic Elastomers, and Polyurethanes; and said second component being at least one water free neutralizing chemical.

2. The process of claim 1 wherein the melt blending is carried out at a temperature above 80° C.

3. The process of claim 1 wherein the melt blending is carried out above the melting temperature of the first and second components.

4. The process of claim 1 wherein the first and second components are dried before use.

5. The process of claim 1 wherein the melt blending is shear mixing.

6. The process of claim 1 wherein any water in the first or second components is vented during the melt blending.

7. The process of claim 1, further comprising granulating the blended components.

8. The process of claim 1 wherein the polymer material is wholly or substantially free of water.

9. The process of claim 1 wherein the hydrophilic polymer is polyvinyl alcohol.

10. The process of claim 1 wherein the neutralizing chemical is a polyethyleneimine.

11. The process of claim 10 wherein the polyethyleneimine has a viscosity of 200000 mPa·s.

12. The process of claim 2 wherein the melt blending is carried out at a temperature above 150° C.

13. The process of claim 5 wherein the melt blending of the first and second components is shear mixing under pressure not exceeding 10,000 psi.

14. The process of claim 1, wherein the melt blending is by extrusion.

15. The process of claim 14 wherein the extrusion is compound extrusion.

16. The process of claim 2, wherein the melt blending is carried out at a temperature above 100° C.

17. The process of claim 9, wherein the neutralizing chemical is polyethyleneimine.

18. A process for providing a polymer material, said process comprising melt blending, in the complete or substantial absence of water, a mixture consisting essentially of polyvinyl alcohol and polyethyleneimine.

19. The method of claim 18, wherein the polyvinyl alcohol constitutes at least about 50 weight % of the mixture consisting essentially of polyvinyl alcohol and polyethyleneimine.

20. A process for providing a polymer material, said process comprising melt blending, in the complete or substantial absence of water, a mixture consisting essentially of at least 50 to 95 weight % of a first component, the remainder being a second component; and shape forming said melt blended mixture;

wherein said first component is at least one hydrophilic polymer selected from the group consisting of Poly Vinyl Alcohols, Ethylene Vinyl Alcohols, Poly Hydroxyethyl Methacrylates, Poly Ethylene Oxides, Poly Ether block Amides, Breathable Thermoplastic Elastomers, and Polyurethanes; and said second component is at least one water free neutralizing chemical.

21. The process according to claim 20, wherein the first component is polyvinyl alcohol and the second component is polyethyleneimine.

22. A process for providing a polymer material, said process comprising melt blending, in the complete or substantial absence of water, a mixture consisting essentially of at least 50 to 95 weight % of a first component, the remainder being a second component said first component being at least one hydrophilic polymer selected from the group consisting of Poly Vinyl Alcohols, Ethylene Vinyl Alcohols, Poly Hydroxyethyl Methacrylates, Poly Ethylene Oxides, Poly Ether block Amides, Breathable Thermoplastic Elastomers, and Polyurethanes; and said second component being at least one water free neutralizing chemical wherein said melt blended mixture is useable in a subsequent shape forming process.

23. The process according to claim 22, wherein the first component is polyvinyl alcohol and the second component is polyethyleneimine.

* * * * *